US007675199B2

(12) United States Patent
Kuroda et al.

(10) Patent No.: US 7,675,199 B2
(45) Date of Patent: Mar. 9, 2010

(54) DISCONNECTION DETECTING CIRCUIT

(75) Inventors: Takao Kuroda, Nagoya (JP); Hiroshi Imai, Kariya (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 11/976,505

(22) Filed: Oct. 25, 2007

(65) Prior Publication Data

US 2008/0116752 A1 May 22, 2008

(30) Foreign Application Priority Data

Nov. 20, 2006 (JP) ............................ 2006-312894

(51) Int. Cl.
*H01H 47/00* (2006.01)
*H01H 83/00* (2006.01)
*H02J 7/00* (2006.01)

(52) U.S. Cl. ..................................................... 307/125

(58) Field of Classification Search .................. 307/9.1, 307/113, 115, 125
See application file for complete search history.

(56) References Cited

U.S. PATENT DOCUMENTS 7,531,920 B2 * 5/2009 Itoh .......................... 307/113

FOREIGN PATENT DOCUMENTS

JP A-2002-238291 8/2002

* cited by examiner

*Primary Examiner*—Albert W Paladini
*Assistant Examiner*—Carlos Amaya
(74) *Attorney, Agent, or Firm*—Posz Law Group, PLC

(57) ABSTRACT

In a disconnection detecting mode, first and second MOS-FETs are turned off, a transistor is turned on, and charges of a capacitor are initialized. After that, third and fourth MOS-FETs are alternately turned on/off by drive signals and having a complementary relation. When an antenna is connected normally, a pulse AC signal is transmitted to an output terminal via the antenna, and current flows from the output terminal into the capacitor via a resistor, a diode, and a resistor. When a voltage across terminals becomes equal to or higher than a determination reference voltage, a disconnection detection signal is changed to the H level (a connection state).

25 Claims, 8 Drawing Sheets

DISCONNECTION DETECTING CIRCUIT

CROSS REFERENCE TO RELATED APPLICATION

This application is based on and incorporates herein by reference Japanese Patent Application No. 2006-312894 filed on Nov. 20, 2006.

FIELD OF THE INVENTION

The present invention relates to a circuit for detecting disconnection of a load which is AC (Alternate Current) driven by a load drive circuit.

BACKGROUND OF THE INVENTION

A winding in a motor is equivalently made by an inductance and a resistor, so that disconnection can be detected on the basis of current flowing when a DC (Direct Current) voltage is applied. There is a motor disconnection detection system for alternately applying positive and negative voltages in predetermined cycles to a motor connected to an H bridge circuit and performing disconnection detection on the basis of the number of pulses per unit time of a pulse signal obtained by differentiating a current signal detected by a motor current detecting means (refer to Patent Document 1).

Patent Document 1: JP-2002-238291 A

On the other hand, there is a load, such as an antenna and specific sensor, in which a capacitor is formed in series equivalently between terminals. Disconnection of such a load cannot be detected in a DC driven state. FIG. 5 shows a conventional disconnection detecting circuit provided for a drive circuit for an antenna. A drive circuit 2 for an antenna 1 is a so-called H-bridge circuit including, between power supply lines 3 and 4, (i) N-channel-type MOSFETs 7 and 8 sandwiching an output terminal 5 and connected in series and (ii) N-channel-type MOSFETs 9 and 10 sandwiching an output terminal 6 and connected in series. By alternately turning on/off the MOSFETs 7 and 10 and the MOSFETs 8 and 9 in accordance with the output frequency, alternate current is passed to the antenna 1.

To the MOSFET 10, a series circuit of a MOSFET 11 for sensing current and a shunt resistor 12 is connected in parallel. A comparator 13 compares a voltage Vc applied across terminals of the shunt resistor 12 with a reference voltage Vref, thereby obtaining a disconnection detection signal Sb. FIGS. 6A and 6B show wavelengths when the antenna 1 is normally connected, of the voltage of the output terminal 5, current flowing in the antenna 1, the voltage across the terminals of the shunt resistor 12, and the disconnection detection signal Sb in order from the top. FIG. 6A shows a desired resonance state where the antenna 1 and the drive circuit 2 match. FIG. 6B shows a state deviated from the desired resonance state due to the kind of the antenna, the constant of the antenna, variations in the constant, and the like.

When the center position of the on period of the MOSFETs 7 and 10 is set as a predetermined detection timing P, in the case of FIG. 6A, the disconnection detection signal Sb becomes the L level when the antenna 1 is disconnected, and the disconnection detection signal Sb becomes the H level when the antenna 1 is connected. Consequently, disconnection can be normally detected. In contrast, in the case of FIG. 6B, due to delay of the phase of current, also when the antenna 1 is connected, the voltage across the terminals of the shunt resistor 12 at the detection timing P drops, the disconnection detection signal Sb becomes the L level, and erroneous detection occurs. Depending on the deviation of resonance, the phase of current advances.

To prevent the erroneous detection, a method of setting the reference voltage Vref to be low may be considered. However, when the reference voltage Vref is decreased, erroneous detection due to noise tends to occur. A method of increasing current flowing in the shunt resistor 12 by increasing the size of the MOSFET 11 for sensing current may be also considered. However, the chip area in an IC increases, and the cost increases.

SUMMARY OF THE INVENTION

In view of the circumstances, it is an object of the present invention to provide a disconnection detecting circuit capable of preventing erroneous detection of disconnection of a load due to variations in the characteristic of the load and noise while realizing an extremely simplified circuit configuration.

To achieve the above object, according to an example of the present invention, a disconnection detecting circuit is provided for detecting disconnection of a load connected to a pair of a first output terminal and a second output terminal of a load drive circuit for supplying an AC signal to the load. The disconnection circuit comprises the following: a capacitor; a diode; an initialization circuit; a determination circuit; and a control circuit. The diode is connected in a chargeable direction between (i) the second output terminal, to which one end of the load is connected, and (ii) the capacitor. The initialization circuit is for initializing charges in the capacitor. The determination circuit is for outputting a disconnection detection signal when a voltage across terminals of the capacitor is lower than a predetermined determination reference voltage. If executing disconnection detection, the control circuit electrically sets the second output terminal to a high-impedance state in the load drive circuit, operates the initialization circuit to initialize charges in the capacitor, makes the load drive circuit operate, and drives the first output terminal, to which an opposite end of the load is connected, with an AC signal.

According to another example of the present invention, the above disconnection detecting circuit is included in an antenna drive system, a motor drive system, a digital amplifier system, or a semiconductor device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

A first embodiment of applying the present invention to a drive circuit for an antenna will be described with reference to FIGS. 1 and 2.

Figure 1:
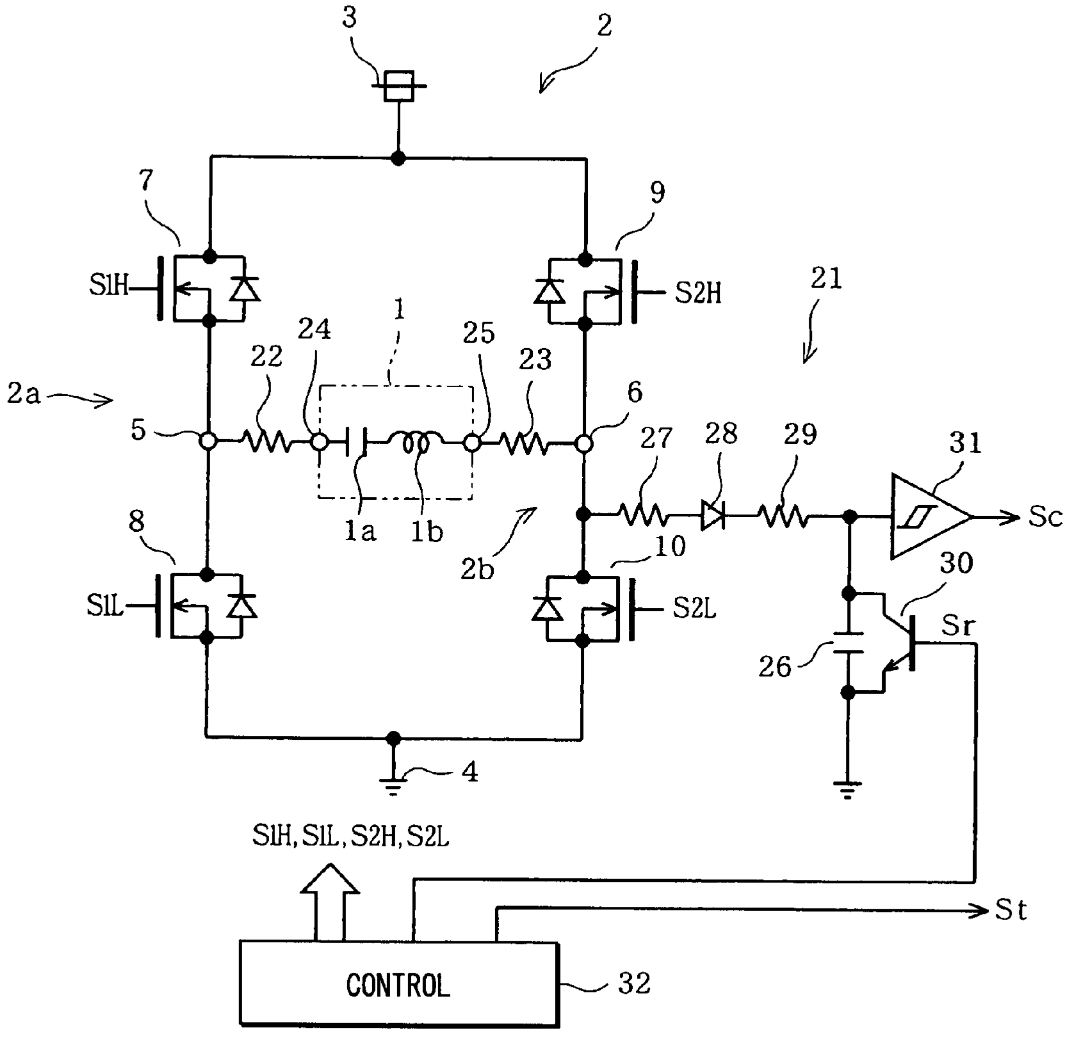
FIG. 1 is a configuration diagram of a drive circuit for an antenna and a disconnection detecting circuit in a first embodiment of the present invention.
Figure 2:
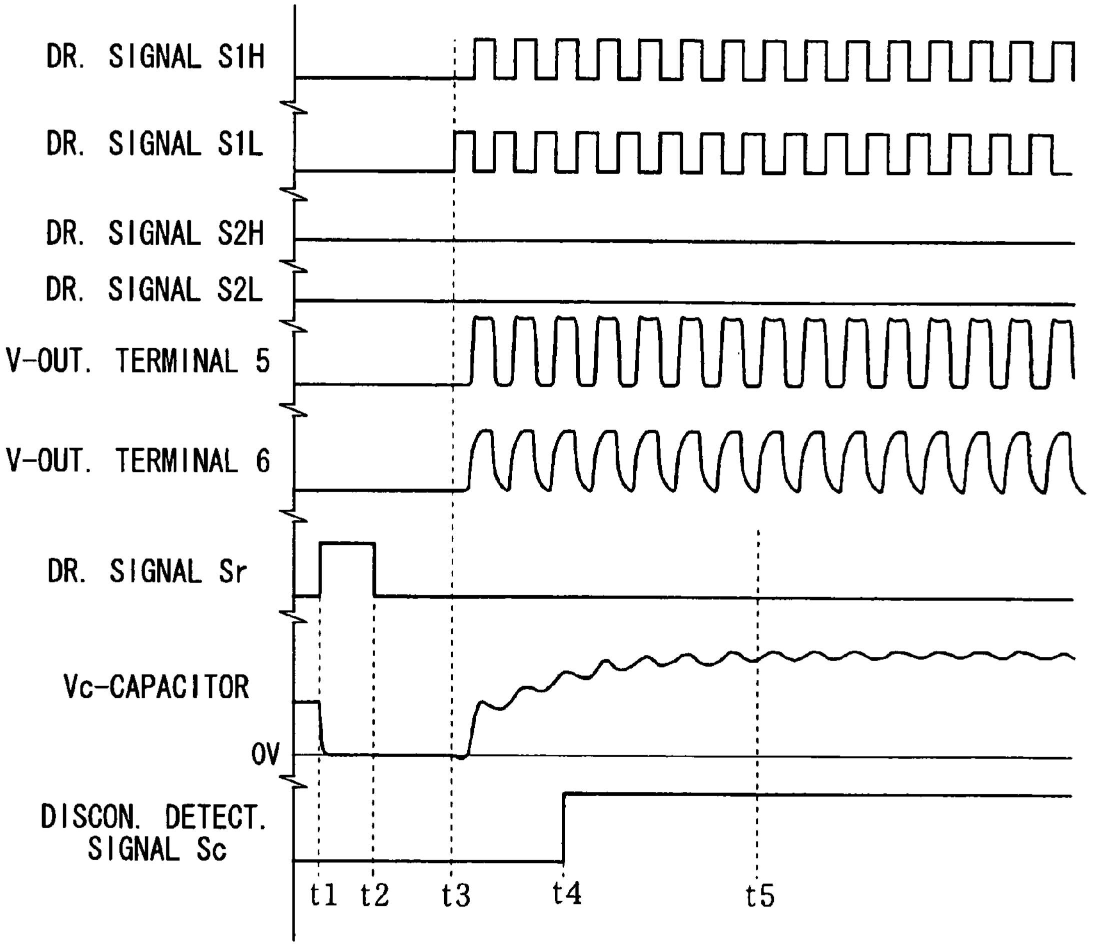
FIG. 2 is a diagram showing waveforms of signals in a disconnection detection mode when the antenna is normally connected.
Figure 5:
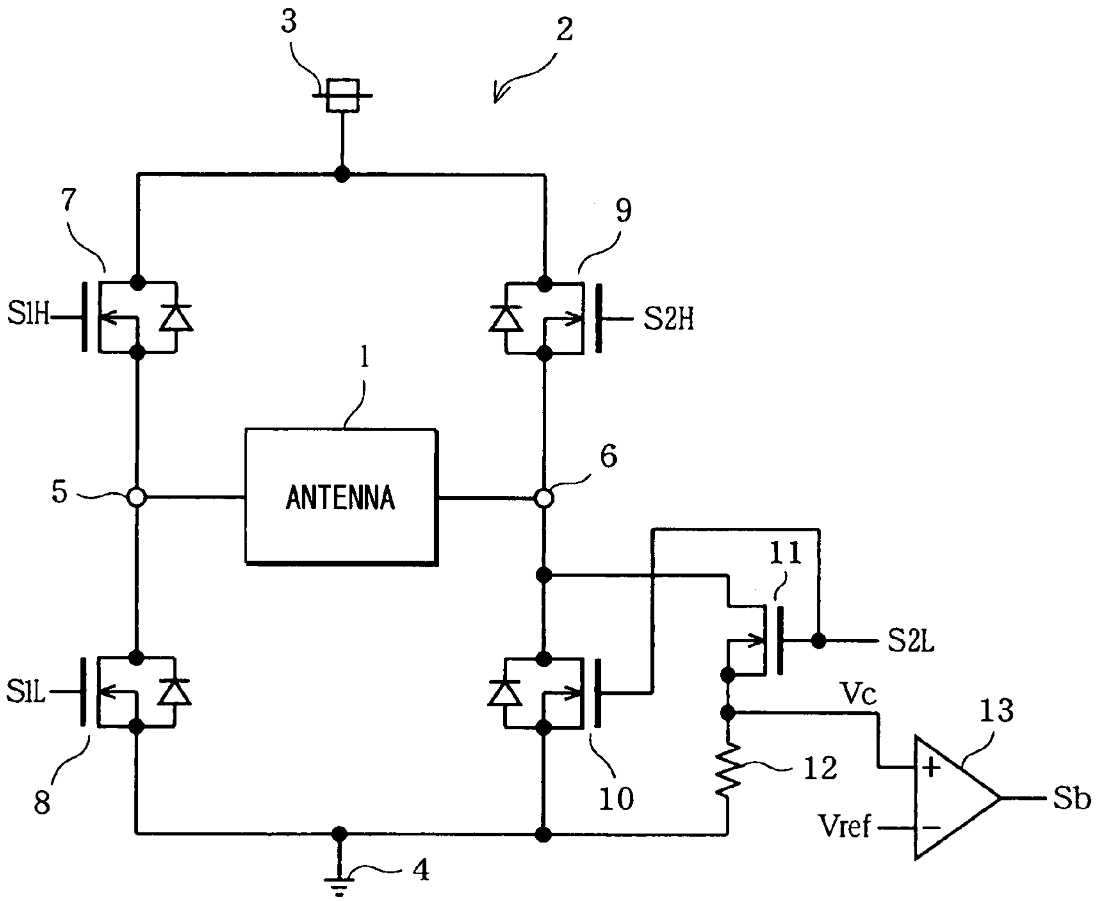
FIG. 5 PRIOR ART
FIG. 5 is a diagram corresponding to FIG. 1 and shows a prior art.
Figure 6A:
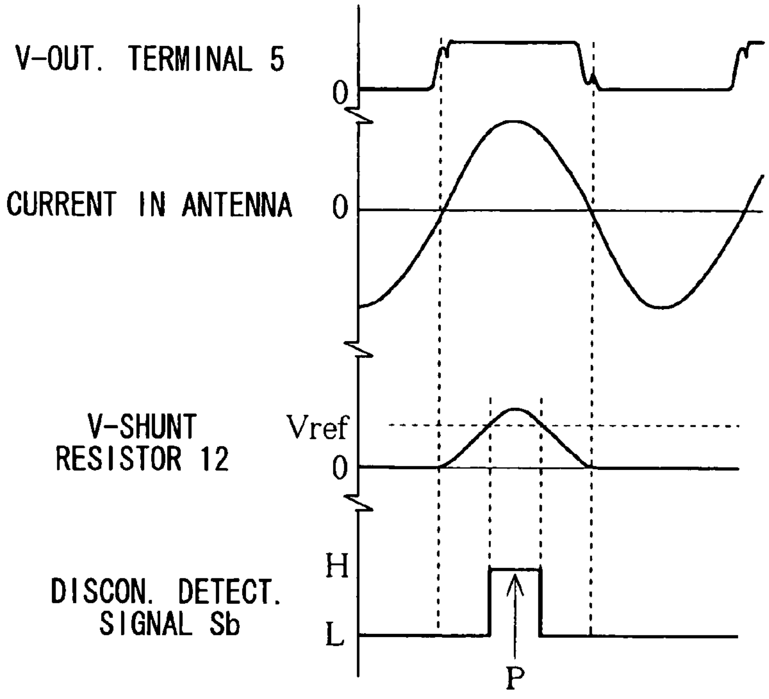
FIG. 6A PRIOR ART
FIG. 6A is a diagram showing waveforms of signals when the antenna is connected and show a resonance state where there is a match in the prior art.
Figure 6B:
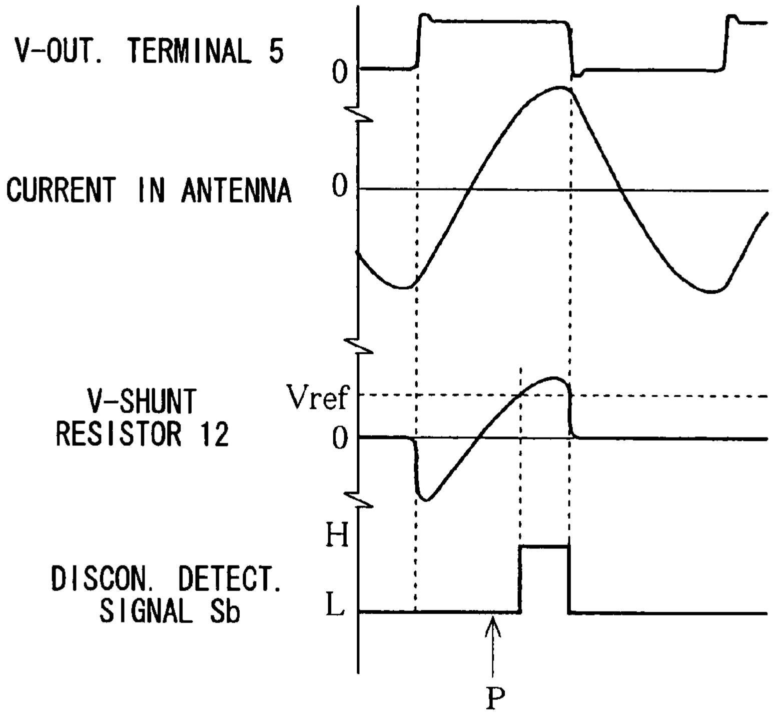
FIG. 6B PRIOR ART
FIG. 6B is a diagram showing waveforms of signals when the antenna is connected and show a resonance state where current delays in the prior art.

FIG. 1 shows a disconnection detecting circuit provided for the drive circuit for an antenna, i.e., an antenna drive system, and the same reference numerals are designated to the same components as those of FIG. 5. An antenna 1 (corresponding to a load) is connected to an on-vehicle device (not shown) of a keyless entry system which unlocks a door when the user with an electromagnetic wave key approaches a vehicle and locks the door when the user goes away from the vehicle. The antenna 1 is mounted in each of doors, a compartment, a trunk, a bumper, and the like of the vehicle. Each of the antennas 1 is driven by a corresponding drive circuit 2 (corresponding to a load drive circuit). The on-vehicle device periodically transmits electric waves. When the electromagnetic wave key receives the electric waves, it sends back a response signal.

The drive circuit 2 for the antenna 1 and a disconnection detecting circuit 21 are constructed as a semiconductor integrated circuit device (IC). The drive circuit 2 is a so-called H bridge circuit constructed by bridge circuits 2*a* and 2*b*. A bridge circuit 2*a* is made by N-channel-type MOSFETs 7 and 8 (first and second switching elements) connected in series while sandwiching an output terminal 5 between power supply lines 3 and 4. A bridge circuit 2*b* is made by N-channel-type MOSFETs 9 and 10 (first and second switching elements) connected in series while sandwiching an output terminal 6.

Between the output terminals 5 and 6 of the IC, a resistor 22, the antenna 1, and a resistor 23 are connected in series. The antenna 1 can be expressed as a series circuit of a capacitor 1*a* and a coil 1*b*. The resistors 22 and 23 are connected between the output terminals 5 and 6 of the IC and external terminals 24 and 25 of the on-vehicle device housing the IC, respectively. The resistors 22 and 23 play a protection function of regulating current when the antenna 1 or a wiring cable is short-circuited on the outside of the on-vehicle device, a protection function against surge voltage, and a function of adjusting current flowing in the antenna 1.

The disconnection detecting circuit 21 includes (i) a capacitor 26 whose one end is connected to the ground, (ii) a resistor 27 (corresponding to a first resistor) connected in series between the output terminal 6 and the other end of the capacitor 26, (iii) a diode 28, (iv) a resistor 29 (corresponding to a second resistor), (v) a transistor 30 (corresponding to an initialization circuit) whose collector and emitter are connected between both terminals of the capacitor 26, and (vi) a buffer circuit 31 (corresponding to a determination circuit) of a Schmitt input type.

The diode 28 is connected in the direction of flowing charge current from the output terminal 6 to the capacitor 26, and has the function of preventing backflow from the capacitor 26 to the output terminal 6. A threshold voltage from the L level to the H level of the buffer circuit 31 is regarded as a determination reference voltage Vth. The resistors 27 and 29 (particularly, the resistor 27) are provided to protect the disconnection detecting circuit 21 from surge voltage entering from the outside of the IC. The resistors 27 and 29 (particularly, the resistor 29) are provided to set electrostatic capacity of the capacitor 26 and a proper time constant. One of the resistors 27 and 29 may be omitted.

A control circuit 32 controls the drive circuit 2 and the disconnection detecting circuit 21, outputs drive signals S1H, S1L, S2H, and S2L to the gates of the MOSFETs 7, 8, 9, and 10, and outputs a drive signal Sr to the base of the transistor 30. In the disconnection detection mode, accompanying a disconnection detection signal Sc output from the buffer circuit 31, a timing signal St instructing a timing of fetching the disconnection detection signal Sc is output.

Next, the operation of the disconnection detecting circuit 21 will be described with reference to FIG. 2.

In the case of driving the antenna 1 in a normal mode of transmitting electric waves, the control circuit 32 alternately turns on/off the MOSFETs 7 and 10 and the MOSFETs 8 and 9 in accordance with the output frequency (for example, about 100 kHz to 200 kHz) to pass the alternate current to the antenna 1.

On the other hand, the control circuit 32 temporarily moves to the disconnection detection mode, for example, when a detached battery is connected to the on-vehicle device, and detection of disconnection of the antenna 1 is executed by the method described below. FIG. 2 shows waveforms of signals in the disconnection detection mode when the antenna 1 is normally connected. The signals are, in order from the top, the drive signals S1H, S1L, S2H, and S2L, the voltage of the output terminal 5, the voltage of the output terminal 6, the drive signal Sr, the voltage Vc applied across the terminals of the capacitor 26, and the disconnection detection signal Sc.

The control circuit 32 fixes the drive signals S2H and S2L to the L level, turns off the MOSFETs 9 and 10, and sets the output terminal 6 in the drive circuit 2 to a high impedance state. Since charges are accumulated in the capacitor 26 when the antenna 1 is driven in the normal mode or noise occurs, the drive signal Sr is set to the H level to turn on the transistor 30, and the capacitor 26 is discharged (initialized) (time t1). After that, the drive signal Sr is reset to the L level (time t2) and the MOSFETs 7 and 8 are alternately turned on/off by the drive signals S1H and S1L having the complementary relation (time t3). The drive frequency at this time may be different from that in the normal mode.

The voltage of the output terminal 5 changes between the voltage of the power supply line 3 and the voltage (0V) of the power supply line 4 by the AC driving, and a pulse AC signal is transmitted to the output terminal 6 via the antenna 1. When the MOSFET 7 is on, the voltage of the output terminal 6 rises, and current flows from the output terminal 6 into the capacitor 26 via the resistor 27, the diode 28, and the resistor 29. On the other hand, when the MOSFET 8 is on, the voltage of the output terminal 6 drops. However, no current flows from the capacitor 26 into the output terminal 6 due to the existence of the diode 28.

As a result, with lapse of time, charges are accumulated in the capacitor 26, the voltage Vc accumulated across the terminals gradually rises and, at time t4 when the voltage Vc across the terminals becomes equal to or higher than the determination reference voltage Vth, the disconnection detection signal Sc changes from the L level to the H level. A logic determination circuit (not shown) to which the disconnection detection signal Sc is supplied fetches the disconnection detection signal Sc at time t5 instructed by the timing signal St output from the control circuit 32. When the fetched disconnection detection signal Sc is at the H level, the antenna 1 is normally connected. When the fetched disconnection detection signal Sc is at the L level, it can be determined that the antenna 1 is in the disconnected state.

To reliably prevent erroneous detection due to variations in the constant of the antenna 1 and noise, it is necessary to properly output the timing signal St to fetch the disconnection detection signal Sc. Concretely, it is preferable to output the timing signal St after a first time point and before a second time point. The first time point is when time elapses since the capacitor 26 is initialized and output of the drive signals S1H and S1L starts, and further when the voltage Vc applied across terminals is sufficiently stable. The second time point is when the voltage Vc across the terminals becomes close to the determination reference voltage Vth due to entry of noise.

In the foregoing embodiment, the disconnection detecting circuit 21 including the resistors 27 and 29, the diode 28, the capacitor 26, the transistor 30, and the buffer circuit 31 is connected to the output terminal 6 as one of output terminals of the drive circuit 2 constructed as the H bridge circuit; the output terminal 6 is held in the high impedance state in the drive circuit 2 in the disconnection detection mode; and the other output terminal 5 is driven with alternate current. This configuration allows the detection for disconnection of the antenna 1 in which a capacitor 1*a* is equivalently formed in series between the terminals.

The disconnection detecting circuit 21 integrates the AC signal transmitted to the output terminal 6 by the AC driving in the capacitor 26 and generates the disconnection detection signal Sc by comparison between the voltage Vc across the terminals of the capacitor 26 and the determination reference voltage Vth. Dependency on the kind of the antenna 1, the constant (characteristic), variations of the constant, and the like is low, and disconnection can be detected reliably. When the antenna 1 is normally connected, the voltage Vc across terminals is relatively high. Consequently, the determination reference voltage Vth can be set high, and erroneous detection due to noise can be also prevented.

It is unnecessary to add a semiconductor element for sensing as provided for a conventional circuit to the disconnection detecting circuit 21, and the configuration of the disconnection detecting circuit 21 is simpler than that of the conventional circuit. Therefore, the chip area of the IC can be also reduced, and the manufacture cost can be decreased.

Second Embodiment

A second embodiment of the present invention will be described with reference to FIG. 3.

Figure 3:
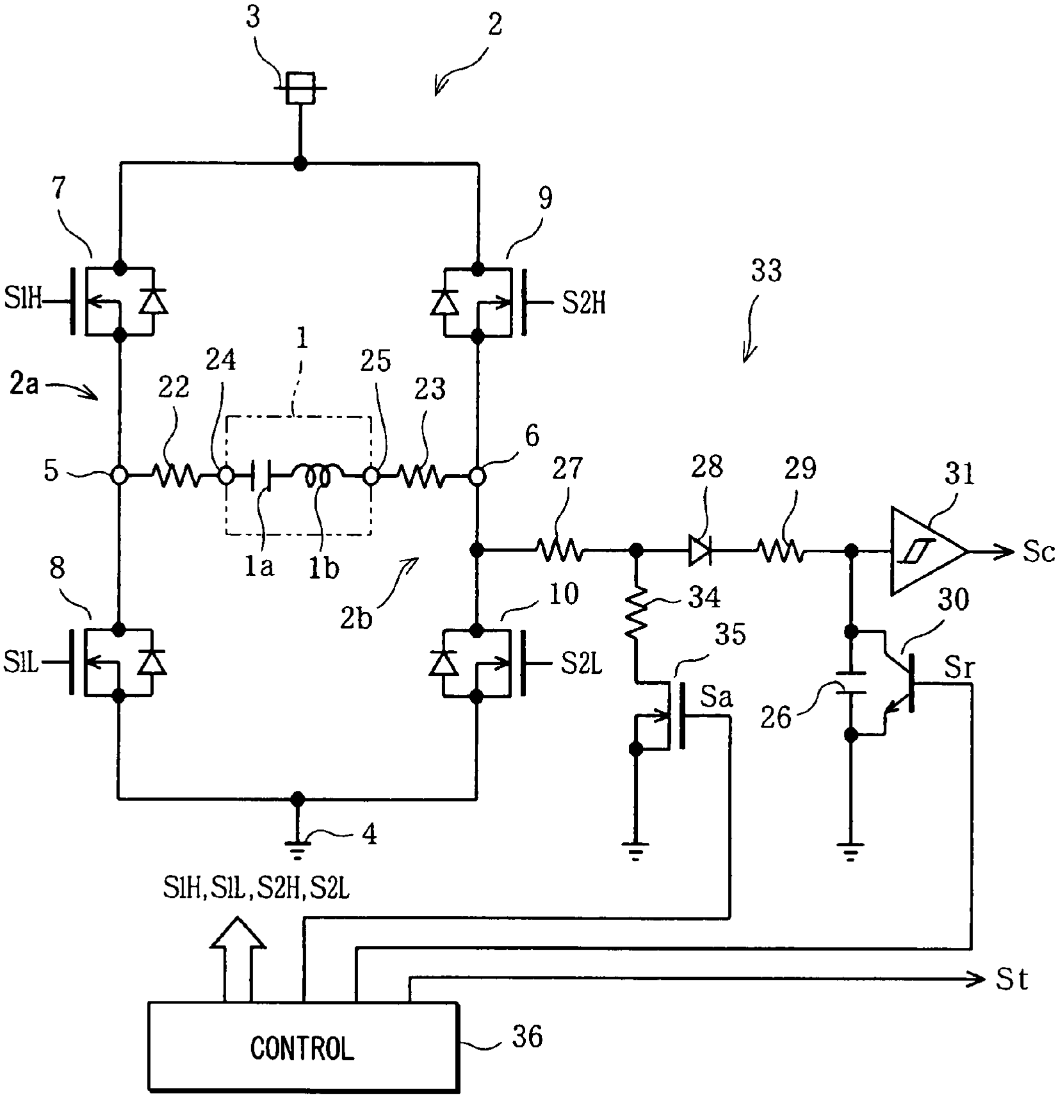
FIG. 3 is a diagram corresponding to FIG. 1 and shows a second embodiment of the present invention.

FIG. 3 shows an antenna disconnection detecting circuit 33. The same reference numerals are designated to the same components as those of FIG. 1. The disconnection detecting circuit 33 has a configuration in which a resistor 34 (corresponding to a third resistor) and a MOSFET 35 (corresponding to a first switch circuit) are connected in series between the anode of the diode 28 in a signal path extending from the output terminal 6 to the diode 28 and the power supply line 4 (ground). A control circuit 36 outputs a drive signal Sa to the MOSFET 35. Except for this point, the disconnection detecting circuit 33 has the same configuration as that of the disconnection detecting circuit 21 shown in FIG. 1.

In the normal mode, the control circuit 36 sets the drive signal Sa to the L level to turn off the MOSFET 35. On the other hand, in the disconnection detection mode, the drive signal Sa is set to the H level, and the MOSFET 35 is turned on. When the MOSFET 35 is turned on, pull-down occurs via the resistor 34, so that the impedance of the signal passage can be decreased. As a result, erroneous detection due to noise can be prevented more reliably.

Third Embodiment

A third embodiment of the present invention will be described with reference to FIG. 4.

Figure 4:
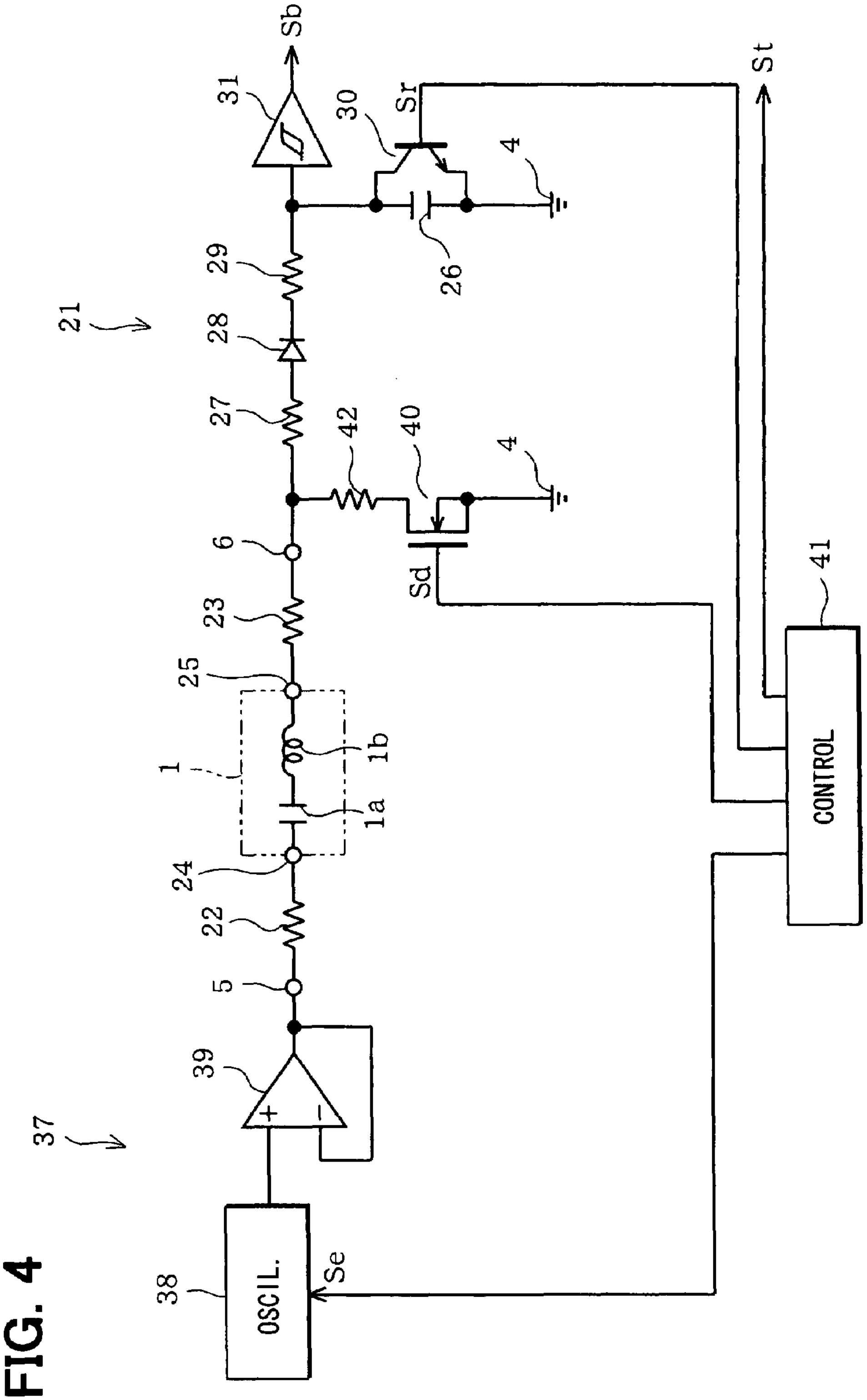
FIG. 4 is a diagram corresponding to FIG. 1 and shows a third embodiment of the present invention.

FIG. 4 shows a disconnection detecting circuit provided for the drive circuit for an antenna. The same reference numerals are designated to the same components as those of FIG. 1. A drive circuit 37 for the antenna 1 includes an oscillation circuit 38, an operational amplifier 39 (corresponding to a linear amplifier), a resistor 42 (corresponding to a fourth resistor), and a MOSFET 40 (corresponding to a second switch circuit). The configuration of the disconnection detecting circuit 21 is the same as that of the first embodiment. The oscillation circuit 38 generates an AC signal having a predetermined frequency in accordance with an oscillation instruction signal Se from the control circuit 41.

In the normal mode, the control circuit 41 sets the drive signal Sd to the H level, turns on the MOSFET 40, and connect one end of the antenna 1 to the power supply line 4 via the resistor 42. The operational amplifier 39 drives the other end of the antenna 1 connected to the output terminal 5 by an AC signal output from the oscillation circuit 38.

In the disconnection detection mode, the control circuit 41 sets the drive signal Sd to the L level, turns off the MOSFET 40, and disconnects the one end of the antenna 1 from the power supply line 4 (ground). In this state, the drive signal Sr is temporarily set to the H level to initialize the capacitor 26. After that, the operational amplifier 39 drives the other end of the antenna 1 by an AC signal output from the oscillation circuit 38.

Also in the third embodiment, disconnection of the antenna 1 can be detected in a manner similar to the first embodiment. In a manner similar to the second embodiment, the resistor 34 and the MOSFET 35 may be provided in series between the anode of the diode 28 and the power supply line 4. In the disconnection detection mode, the MOSFET 35 may be turned on.

(Modifications)

The present invention is not limited to the foregoing embodiments shown in the diagrams but may be modified or expanded as follows.

In each of the disconnection detecting circuits 21 and 33 for the drive circuits 2 and 37 provided for the plurality of antennas 1, the cathodes of the diodes 28 may be connected to each other and the subsequent circuits (the resistor 29, the capacitor 36, the transistor 30, and the buffer circuit 31) may be commonly used. In this case, the disconnection detection is detected in order on the plurality of antennas 1. With the configuration, although time required for the disconnection detection becomes longer, the layout area of the capacitor 26 and the like can be reduced.

Figure 7:
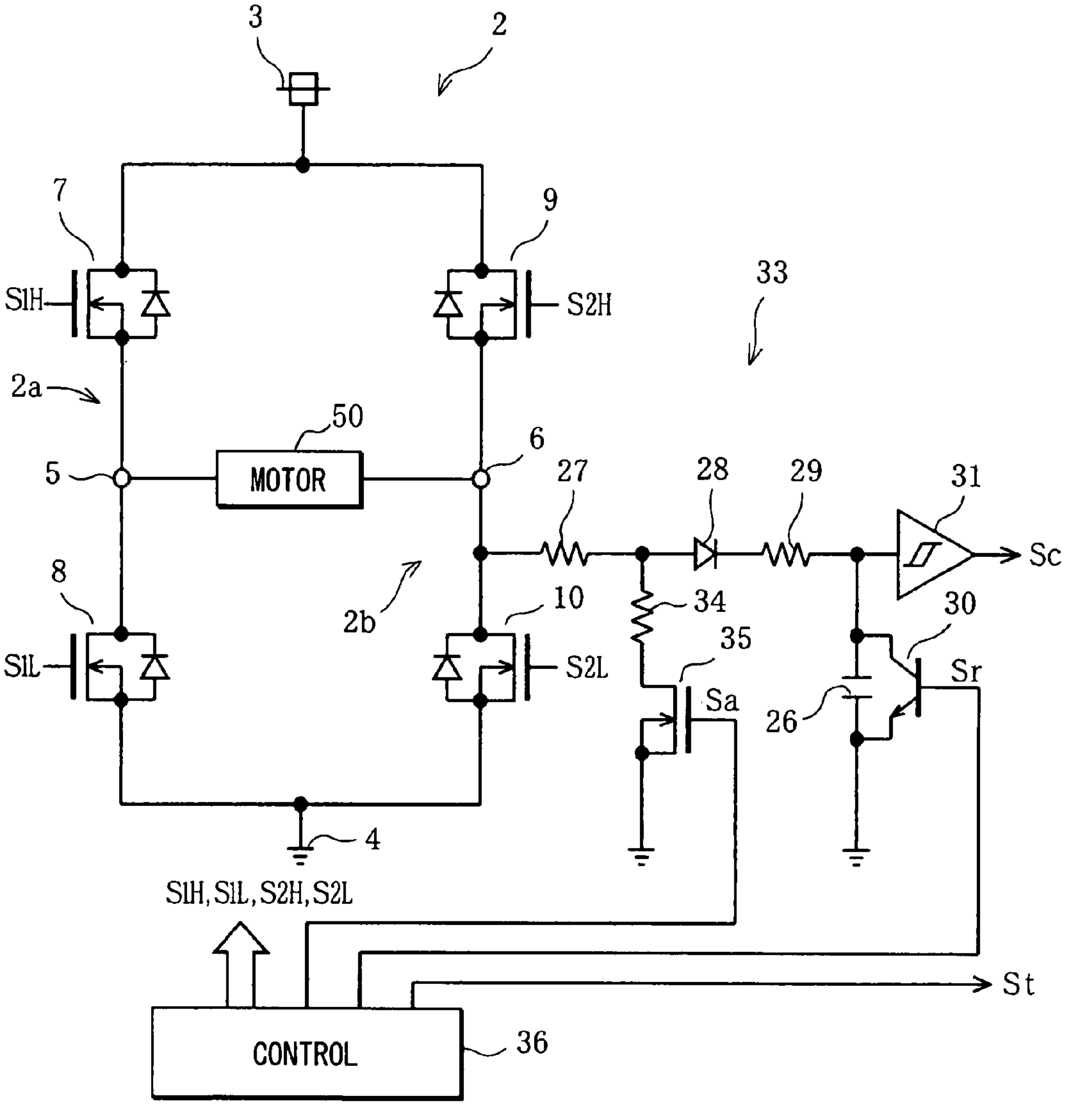
FIG. 7 is a configuration diagram of a drive circuit for a motor and a disconnection detecting circuit in another embodiment of the present invention.
Figure 8:
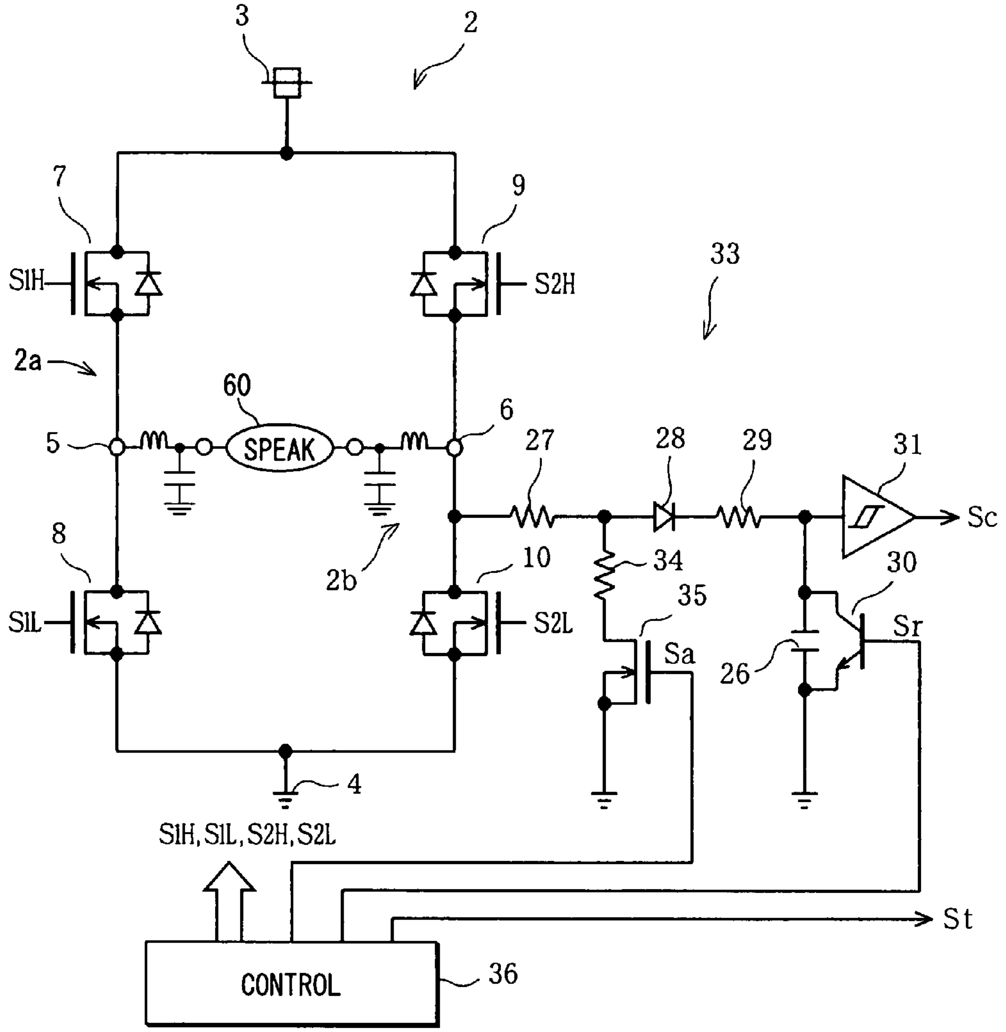
FIG. 8 is a configuration diagram of a drive circuit for a speaker and a disconnection detecting circuit; in yet another embodiment of the present invention.

The load is not limited to the antenna but may be a sensor (particularly, a sensor in which a capacitor is equivalently formed between terminals), a motor winding 50 (see FIG. 7), or other loads (particularly, loads driven with an AC signal). Further, the load can be a speaker 60 as a high-output power digital amplifier (see FIG. 8) or a semiconductor device. That is, the disconnection detecting circuit according to the above embodiments can be included in a motor drive system, or a digital amplifier system as well as the antenna drive system.

Further, the disconnection detecting circuit according to the above embodiments can be included as a part of a semiconductor device.

Yet, further, the configuration of the disconnection detecting circuit according to the above embodiments can be used as a part of a amplifier, pump, wireless terminal, vehicle, robot, machine tool, business instrument, medical instrument, game machine, electronic musical instrument, electric tool, welfare instrument, power machine, electric appliance, industrial apparatus, ship, airplane, or the like.

The configuration of the load drive circuit is not limited to the drive circuits 2 and 37 but may be a circuit having a function of supplying an AC signal to a load. The first switching element on the high side and the second switching element on the low side may be constructed by a combination of a P-channel-type MOSFET and an N-channel-type MOSFET, a combination of an NPN-type transistor and an NPN-type transistor, or a combination of a PNP-type transistor and an NPN-type transistor.

A MOSFET may be employed instead of the transistor 30. In place of the buffer circuit 31, a Schmitt-input-type inverter circuit, a comparator circuit, or the like may be employed.

Aspects of the subject matter described herein are set out in the following clauses.

As an aspect, in the case of executing disconnection detection, by electrically setting an output terminal (second output terminal) to which one end of a load is connected to a high-impedance state by a load drive circuit, the output terminal and the load drive circuit are electrically disconnected from each other. By operating an initialization circuit, charges of a capacitor are initialized. After that, the load drive circuit is operated, and an output terminal (first output terminal) to which the other end of the load is connected is driven by an AC signal.

When the load is not disconnected, an AC signal accompanying the AC driving is transmitted to the output terminal to which one end of the load is connected via the load. The AC signal is sent to a capacitor via a diode. Because of the existence of the diode for preventing backflow, charges accumulated in the capacitor are not discharged to the output terminal. As a result, the voltage across terminals of the capacitor gradually increases and becomes equal to or higher than a determination reference voltage. Therefore, a determination circuit does not output a disconnection detection signal.

On the other hand, when the load is disconnected, the AC signal accompanying the AC driving is not transmitted to the output terminal to which one end of the load is connected, and the capacitor is not charged. As a result, the voltage across terminals of the capacitor does not increase and remains lower than the determination reference voltage. Therefore, the determination circuit outputs the disconnection detection signal.

With the above structure, even in a load such as an antenna or a specific sensor in which a capacitor is equivalently formed in series between terminals, the AC signal is transmitted to the output terminal to which the AC signal is supplied via the capacitor of the load at the time of AC driving, so that disconnection of the load can be detected. Since the disconnection detection is performed by comparing a voltage obtained by integrating the transmitted AC signal by the capacitor with the determination reference voltage, a deviation of the current phase due to the characteristic of the load, variations in the load, and the like does not become an issue. The determination reference voltage can be set to be high by integration, so that erroneous detection caused by noise can be also prevented. Further, it is unnecessary to add a semiconductor element for sensing as provided in the conventional circuit, so that the chip area of an IC can be also reduced.

Under the above disconnection detecting circuit, by a first resistor connected to the output terminal, the disconnection detecting circuit can be prevented from surge voltage or the like entering from the outside. By a second resistor, the time constant at the time of charging the capacitor can be set to a desired value. The second resistor may have the protection function, and the first resistor may have the time constant adjusting function.

Under the above disconnection detecting circuit, at the time of disconnection detection, a third resistor may be connected via a first switch circuit between a signal path extending from the output terminal to which one end of the load is connected to the diode and a predetermined power supply line, so that the impedance of the signal path can be decreased. Thus, erroneous detection due to noise can be prevented more reliably.

Under the above disconnection detecting circuit, the load drive circuit may have the configuration of a so-called H bridge circuit. At the normal load driving time, both of the output terminals are driven by two bridge circuits. On the other hand, when disconnection is detected, first and second switching elements sandwiching the output terminal to which one end of the load is connected are turned off to set a high impedance state. In this state, first and second switching elements sandwiching an output terminal to which the other end of the load is connected are alternately turned on and off, thereby AC driving the output terminal.

Under the above disconnection detecting circuit, at the normal load driving time, the output terminal to which one end of the load is connected may be grounded via a fourth resistor and a second switch circuit, and an output terminal to which the other end of the load is connected may be driven by a linear amplifier (for example, an operational amplifier or a push-pull output circuit). On the other hand, at the time of disconnection detection, the output terminal to which one end of the load is connected may be disconnected from the ground by turning off the second switch circuit to set a high impedance state. In this state, the output terminal to which the other end of the load is connected is AC driven by the linear amplifier.

Under the above disconnection detecting circuit, when a plurality of load drive circuits exist, components up to the diode may be provided for each of the load drive circuits, and one capacitor may be commonly used by the load drive circuits. At the time of disconnection detection, the load drive circuits can be sequentially driven and disconnection can be detected by the above-described method. By commonly using the capacitor, the circuit scale (chip size of an IC) can be reduced.

It will be obvious to those skilled in the art that various changes may be made in the above-described embodiments of the present invention. However, the scope of the present invention should be determined by the following claims.

What is claimed is:

1. A disconnection detecting circuit for detecting disconnection of a load connected to a pair of a first output terminal and a second output terminal of a load drive circuit for supplying an AC signal to the load, comprising:

- a capacitor;
- a diode connected in a chargeable direction between (i) the second output terminal, to which one end of the load is connected, and (ii) the capacitor;
- an initialization circuit for initializing charges in the capacitor;

a determination circuit for outputting a disconnection detection signal when a voltage across terminals of the capacitor is lower than a predetermined determination reference voltage; and a control circuit, for executing disconnection detection, and for, when executing the disconnection detection, (i) electrically setting the second output terminal to a high-impedance state in the load drive circuit, (ii) operating the initialization circuit to initialize charges in the capacitor, making the load drive circuit operate, and (iii) driving the first output terminal, to which an opposite end of the load is connected, with an AC signal.

2. The disconnection detecting circuit of claim 1, wherein a resistor is connected in series with the diode.

3. The disconnection detecting circuit of claim 2, wherein the resistor includes (i) a first resistor connected between the second output terminal and the diode and (ii) a second resistor connected between the diode and the capacitor.

4. The disconnection detecting circuit of claim 1, further comprising:

a resistor and a switch circuit connected in series between (i) a signal path extending from the second output terminal to the diode and (ii) a predetermined power supply line, wherein the control circuit executes the disconnection detection in a state where the switch circuit is closed.

5. The disconnection detecting circuit of claim 1, wherein:

the load drive circuit includes an H bridge circuit having two bridge circuits, each of which includes first and second switching elements connected in series while sandwiching one of the output terminals;

if executing the disconnection detection, the control circuit initializes charges of the capacitor in a state where the first and second switching elements sandwiching the second output terminal are turned off, and alternately turns on/off the first and second switching elements sandwiching the first output terminal.

6. The disconnection detecting circuit of claim 1, wherein the load drive circuit has a resistor and a switch circuit between the second output terminal and the ground, and drives the output terminal to which the other end of the load is connected by a linear amplifier, if executing the disconnection detection, the control circuit initializes charges in the capacitor in a state where the switch circuit is turned off, and drives the first output terminal with an AC signal by the linear amplifier.

7. The disconnection detecting circuit of claim 1 being connected further with at least one other load drive circuit for detecting disconnection of a corresponding load, wherein the capacitor is commonly used by the load drive circuit and the at least one other load drive circuit.

8. The disconnection detecting circuit of claim 1 being included in an amplifier.

9. The disconnection detecting circuit of claim 1 being included in a pump.

10. The disconnection detecting circuit of claim 1 being included in a wireless terminal.

11. The disconnection detecting circuit of claim 1 being included in a vehicle.

12. The disconnection detecting circuit of claim 1 being included in a robot.

13. The disconnection detecting circuit of claim 1 being included in a machine tool.

14. The disconnection detecting circuit of claim 1 being included in a business instrument.

15. The disconnection detecting circuit of claim 1 being included in a medical instrument.

16. The disconnection detecting circuit of claim 1 being included in a game machine.

17. The disconnection detecting circuit of claim 1 being included in an electronic musical instrument.

18. The disconnection detecting circuit of claim 1 being included in an electric tool.

19. The disconnection detecting circuit of claim 1 being included in a welfare instrument.

20. The disconnection detecting circuit of claim 1 being included in a power machine.

21. The disconnection detecting circuit of claim 1 being included in an electric appliance.

22. An antenna drive system comprising the disconnection detecting circuit of claim 1.

23. A semiconductor device comprising the disconnection detecting circuit of claim 1.

24. A motor drive system comprising the disconnection detecting circuit of claim 1.

25. A digital amplifier system comprising the disconnection detecting circuit of claim 1.

* * * * *